United States Patent [19]

Breslin et al.

[11] Patent Number: 5,645,878

[45] Date of Patent: *Jul. 8, 1997

[54] NO DRY COATING PROCESS FOR COATED FOOD PRODUCTS

[75] Inventors: James C. Breslin, Bellevue; Alicia A. Perdon, Battle Creek; James B. Holder, Battle Creek; Stephen J. Kalchik, Battle Creek; Jerald L. Longman, Climax, all of Mich.

[73] Assignee: Kellogg Company, Battle Creek, Mich.

[*] Notice: The term of this patent shall not extend beyond the expiration date of Pat. No. 5,516,541.

[21] Appl. No.: 479,159

[22] Filed: Jun. 7, 1995

Related U.S. Application Data

[63] Continuation-in-part of Ser. No. 222,704, Apr. 14, 1994, Pat. No. 5,516,541.

[51] Int. Cl.$^6$ .............................. A23L 1/18; A23L 1/164; A23B 9/14

[52] U.S. Cl. .......................... 426/103; 426/302; 426/303; 426/305; 99/323.9

[58] Field of Search .................... 426/302, 303, 426/305, 103; 99/323.9

[56] References Cited

U.S. PATENT DOCUMENTS

| | | | |
|---|---|---|---|
| 4,089,984 | 5/1978 | Gilbertson . | |
| 4,608,263 | 8/1986 | Bergin et al. | 426/303 |
| 4,647,463 | 3/1987 | Hoover | 426/291 |
| 4,658,708 | 4/1987 | Rastoin . | |
| 4,702,925 | 10/1987 | Verrico . | |
| 4,856,453 | 8/1989 | Verrico . | |
| 5,005,514 | 4/1991 | Verrico . | |
| 5,516,541 | 5/1996 | Breslin et al. | 426/302 |

*Primary Examiner*—Esther Kepplinger
*Assistant Examiner*—Choon P. Koh
*Attorney, Agent, or Firm*—Felfe & Lynch

[57] ABSTRACT

Disclosed is a process and apparatus for producing a topical coating on a food product. The topical coating may be a sweetener wherein a superheated pressurized solution of the sweetener is sprayed on a heated food product to form a coating thereon. The topical coating may also contain a flavoring.

42 Claims, 3 Drawing Sheets

NO DRY COATING PROCESS FOR COATED FOOD PRODUCTS

BACKGROUND OF THE INVENTION

This application is a continuation-in-part of application Ser. No. 08/222,704, filed Apr. 4, 1994, now U.S. Pat. No. 5,516,541.

The present invention is in a dry coating process and system therefore and more particularly in a foodstuff coating process which omits intermediate or pre-coating cooling procedures and apparatus and significantly reduces the processing time for applying a topical coating, such as a sweetener and/or flavoring coatings, to a foodstuff product. The coating process and system is especially useful in forming topical coatings on food products such as cereal products and the like.

Today's consumer is offered a large number of food products which have been prepared, processed and/or treated in numerous ways for considerations such as convenience, appearance, storage stability and, most importantly for organoleptic considerations such as taste or feel during mastication. Presweetened food products such as cereals, cookies, pastries, snack foods, nuts or roasted nuts and candies have long been available. Such products often have surface sweetening which can have different appearances, i.e., glazed, frosted or powdered. Additionally, many food products have flavoring components not only in the food mass itself but also in the topical or surface coatings. Often, due to the intense competition, creative efforts focus on creating unique or exotic flavorings or combinations of sweetening and flavorings.

Topical or surface sweetening and flavoring coatings are usually applied as a solution or slurry. However, the application of surface sweetening and/or surface flavoring to a foodstuff requires a number of different processing steps each of which necessitates a further treatment of the food product and capital and labor expenditures for additional apparatus, control systems and their maintenance. Each process step or operation introduces a potential bottleneck in the process should the apparatus or control systems break down during operation. Each step also is a possible source of producing an off-spec product in the eventuality that that particular part of the system fails to operate properly. Since it is of the utmost importance to food producers to maintain a constant quality of product including taste, smell and appearance, it is highly desirable to eliminate, or minimize the possibilities for off-spec product. This is a special concern when the product contains surface flavoring components. Flavorings often are highly sensitive substances which can, with slight variation in conditions, especially heat, develop an unpleasant taste, consistency or feel.

The coating process also has an economic impact and can entail an expensive series of steps in the production of any given product. Thus, there are many good reasons, including process and quality control and the preference for process and system simplicity, to minimize the number of processing steps without sacrificing the ability to consistently and economically produce a product according to technical specifications and meeting the above mentioned subjective criteria.

SUMMARY OF INVENTION

The present invention is in a coating process and coating system which allows for control of parameters for crystal formation thus enabling the manufacturer to select the coating appearance. The process of the invention eliminates the need for the pre-coating cooling of the hot product and the expensive pre-coat cooling apparatus, while significantly reducing the energy consumption associated with such steps and with operating such system and the associated mechanical difficulties.

The process of the invention eliminates the intermediate processing and advantageously uses the existing energy of the product in combination with a conditioning of the sweetener solution and a topical coating solution containing flavoring components. The inventive process reduces the number of treating cycles of the product and significantly reduces the processing time to coat the product and render it suitable for storage or packaging.

The process of the invention may also be conducted so as to eliminate a separate post-coating drying apparatus and the operation thereof.

In another aspect, the invention is in an improved process and apparatus for the application of sensitive flavoring coatings especially for those flavorings which are heat sensitive.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1:
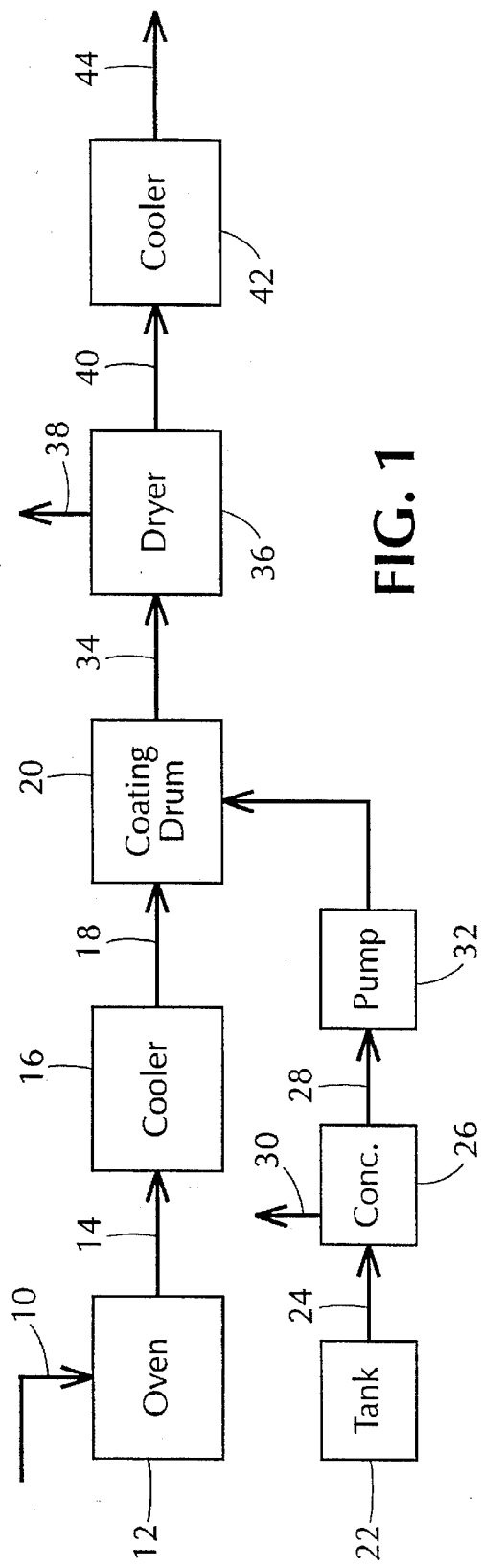
FIG. 1 schematically depicts a typical prior art process flow sheet in block diagram form for applying a sugar coating to a foodstuff.

FIG. 1 generally depicts a typical prior art sugar coating operation for a cereal.

The cereal 10 is introduced into an oven 12, which may be a multi-zone oven, wherein the cereal is toasted at temperatures of about 550°–680° F. and leaves the oven at a temperature of about 300° to 350° F. The toasted product 14 leaving oven 12 has a relatively low moisture content, i.e. 2–4%. The product is then transported to a cooler where the product is cooled to a temperature of less than 100° F. The cooled product has a lower energy level but a higher moisture content. The cooled product 18 is then introduced into a conventional coating drum 20.

Bulk holding tank 22 stores a sugar-water sweetener solution having a concentration of approximately 67 wt.-% sweetener. The solution is introduced into the concentrator 26 where, by the addition of heat, water is evaporated as vapor 30, and the concentration of the sweetening solution 24 is increased to form a syrup 28 having a sugar concentration corresponding to about 82 Brix. The syrup 28 leaves concentrator 26 at a temperature of about 228° to 232° F. and at essentially atmospheric pressure. Syrup 28 is then transported via pump 32 to a coating drum 20 wherein the cooled product 18 is coated with the syrup. Due to the coating of the product, the moisture content of the foodstuff is again increased. The coated product 34, which is still at approximately 100° F., is then fed to a dryer 36, where the coated product is heated by the addition of thermal energy, vapor 38 is driven off and the coating is dried. The heated dry product 40 is at a temperature of approximately 220° F. and is then transferred to a cooler 42 where it is cooled to a temperature of less than 100° F.

Thus it will be seen that the conventional prior art process subjects the toasted cereal to no less than 4 (not including intermediate transfer) separate operations, i.e. a first cooling, coating, drying and a second cooling for processing the food product to form a pre-sweetened cereal for storage or packaging. In the prior art process, the foodstuff is subjected to cyclical increases and decreases of moisture content as well as the addition of, and removal of, energy. The thermal or energy history of the food product over the period between removal from the oven and packaging of the product has a multi-cyclic saw tooth profile. Typical cereal processing times for the above described system from oven discharge to readiness for packaging or storage range from about 700 to 5000 seconds with an average period being about 900 seconds.

Figure 2:
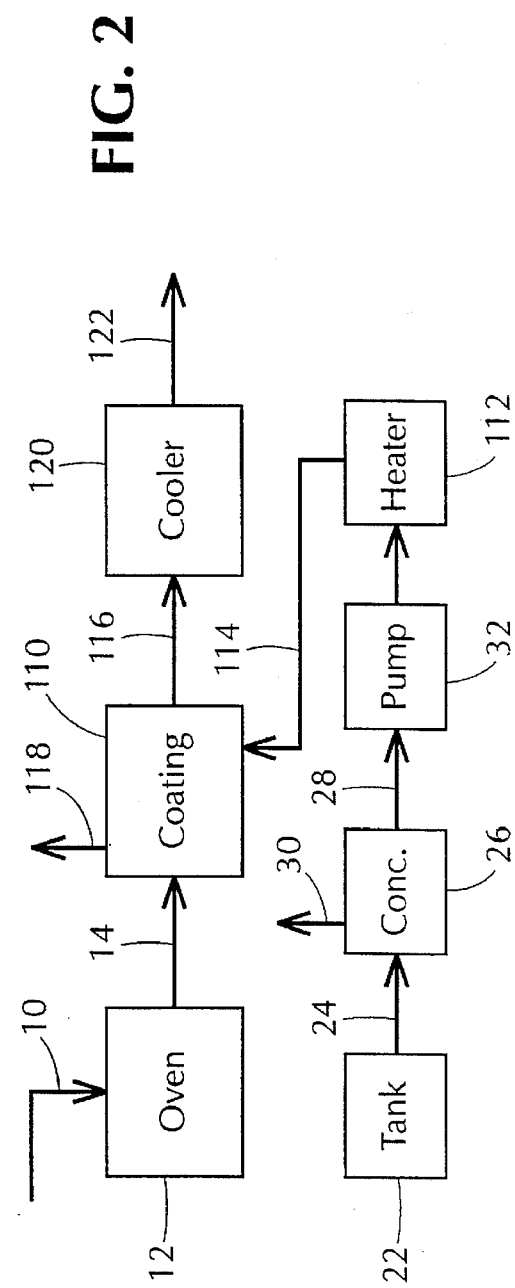
FIG. 2 schematically depicts in block diagram form a flow sheet for a preferred embodiment of the process of the invention.

FIG. 2 is a schematic in flow diagram form illustrating a preferred embodiment of the invention. For simplicity, the following description of the process of the invention will be for production of a pre-sweetened cereal product.

The cereal may be rice, wheat, psyllium, oat, barley, sorghum, corn, brans, or any mixture of cereal grains or ingredients and may be in any form such as flakes, shreds, biscuits, loops, nuggets, puffs or any other suitable form.

The sweetener can be a natural sweetener, such as a sugar, or it may be an artificial sweetening product such as potassium acesulfame or Aspartame, 3-amino-N-(α-carboxyphenethyl) succinamic acid N-methyl ester. Sugar, usually sucrose, is the primary ingredient of the sweetener. Other commonly used sugars include, i.e., dextrose, glucose, fructose, corn syrup, saccharin and other well known natural (honey) and artificial sweetening agents.

The present invention takes advantage of the fact that the rate of crystallization is a function of the rate of nucleation and crystal growth and that crystal formation from a solution can be influenced or controlled by the solute to solvent ratio, the amount of available energy and the presence of nucleation sites. The size, shape and number of predominating crystals can thus be controlled with the result that the quality and appearance of the coating can be controlled. Balancing of the variables allows for the production of coatings with unique appearances.

The appearance of the coating on the food product is largely determined by the degree of crystallinity and crystal size distribution of the sweetening agent in the coating. If the sweetener in the coating, i.e., sugar is present as small crystals (50–100 μm), the coating has a frosted appearance on the food product. If the sugar is largely non-crystalline or is composed of predominantly large crystals (>200 μm in size), the resulting coating has a glazed appearance.

Crystallization is a two-step process. In the first step, known as nucleation, the nuclei are formed. When there is available solute, i.e., sucrose, the second step, crystal growth occurs. The average size of the crystals is inversely related to the number of nuclei present. When only a few nuclei are formed, relatively large (>200 μm) crystals form and the resulting coating has a glazed appearance. When a large number of nuclei are present, a large number of small crystals (50–100 μm) form and the resulting coating has a frost appearance. If too many nuclei are formed, the available solute, i.e., sucrose is greatly reduced and the crystals, still less than 1 μm in size, do not grow. This results in the formation of aggregates or clusters that can give a powdered sugar appearance to the coating. Thus, by controlling the number of nuclei and amount of solute and solvent present, one can largely control the appearance of the resulting coating because the predominant number of crystals is what gives the coating its appearance. For instance if the crystals are predominantly large and of the type that give a glaze appearance, the coating will have that appearance despite the presence of some smaller crystals.

It has been found that a more concentrated solution can be obtained and maintained by altering the conditions of the sweetener solution. In the process of the invention, the sweetener solution is superheated under pressure. Such a step enables one to increase the energy content of solids in solution, if desired, and to maintain the solute/solvent ratio providing favorable nucleation conditions without changing the physical or chemical properties of the solution. It will be understood that as used herein superheating is an addition of thermal energy to the syrup beyond that needed to heat the solution to its boiling point or boiling range in the liquid state at essentially the normal atmospheric pressure of the location. The syrup to be superheated is at, or substantially at, its desired concentration and the additional enthalpy does not, under the pressure condition, result in any substantial change of the solids concentration. If desired, one could use higher concentration sugar solutions than would be possible in conventional techniques, such as that of FIG. 1, since the use of pressurized superheating allows one to use high concentration solutions which, under pressure, maintain solution attributes.

One advantage of the process is that the energy of the superheat can be beneficially used. This is in part because the mass flow rate of the sweetener solution is generally less than the mass flow rate of the foodstuff to be sweetened, i.e. approximately 0.05–0.75 pound sweetener solution per pound of foodstuff.

In the process of the invention, the step of cooling the product from the oven prior to coating the product is omitted. The product is coated in a hot or warm condition and, in combination with the conditioning of the solution, results in obtaining a dry coating without a separate drying step. Another advantage is that the concentrated solutions do not undergo rheological changes which would make their handling characteristics difficult or unpredictable. For instance, while commercially available concentrations of the sweetener corn syrup are generally considered newtonian fluids, higher concentrations often display non-newtonian characteristics and high concentrations of sucrose in water results in mixtures that display the characteristics of a glass.

It has been found that the nuclei formation can most favorably be influenced during the syrup application step and that certain composition modifications can enhance or retard nucleation. In the invention, when using a pure sucrose-water system, a large number of nuclei form resulting in a coating having a powdered sugar look. The addition of a small amount of high fructose corn syrup (HFCS), i.e. 1 to 10 wt.-% and preferably 2–4 wt.-%, can slightly retard nucleation resulting in slightly larger crystals (50–100 μm) and a frost appearance.

It has also been found that the amount of superheat added to the pressurized solution influences the resulting coating appearance. Increased amounts of superheat, i.e. temperatures of approximately 230° to 290° F., tend to form more crystalline coatings with a frost appearance while lesser amounts of superheat, i.e. up to a temperature of about 230° F., tend to give a glazed coating appearance.

Adjusting the sweetener solution composition by adding an invert sugar, such as high fructose corn syrup or honey, can give the coating a frosted sugar appearance when the syrup is superheated to a temperature of 230° to 290° F. At temperatures above 290° F., the appearance of the coating can be controlled by adjusting the amount of the high fructose corn syrup with higher amounts being used at higher temperatures to obtain the frost or glazed sugar appearance.

Referring to FIG. 2, cereal 10 is introduced into oven 12 wherein it is toasted to produce a toasted product 14 at a temperature of approximately 300° to 350° F. The oven 12 is a multi-zone oven operated at temperatures in the range of about 550° to 680° F. The toasted product 14 leaving oven 12 is at an elevated temperature and has a relatively low moisture content.

The hot toasted product from oven 12 may experience some cooling and/or moisture loss while being transferred to a coating apparatus 110. The amount of heat loss will be a function of many variables including the ambient conditions at the location. The heat loss is preferably minimized but some heat loss is unavoidable unless supplementary heat is added. Thus, the exclusion of intermediate or pre-coating cooling does not refer to such heat losses from the product. Preferably the temperature of the product when it is introduced into coating apparatus 110 is no less than about 225°–275° F. when the coating apparatus 110 is being operated at approximately the normal atmospheric pressure of the location. If operated at less than the atmospheric pressure of the location, the product temperature can be lower. If apparatus 110 is operated above the standard atmospheric pressure of the location, the product temperature is preferably above 225° F. to enable the coating to dry.

In the system of the invention, coating apparatus 110 is one wherein the mass of the food product is lifted and separated so that the individual food particles, rather than the foodstuff in a bulk mass form, are actually coated. The residence time of the food product in the coating apparatus can be from about 15 seconds to about a minute. Systems using air should use pre-filtered air to minimize contamination of the food product.

In a preferred embodiment, the coating apparatus 110 is a rotatable drum equipped with lifters. The rotatable drum preferably does not contain any internal conveying mechanism for transporting the food product. That is to say internal rotating screws or brushes are not housed within the coater 110 and are not used to move the food product through the coating apparatus. In the system of the invention, coating apparatus 110 is provided with lifters which are formed with, or attached to, the drum inner wall. The lifters assist in lifting and separating the food product thus exposing additional food product surface, and allowing improved application of the coating solution and improved moisture evaporation from the food stuff surface. The moisture is evacuated from the coating apparatus 110 under a slight vacuum, i.e., generally no more than up to about 1 to 2 inches wg.

Bulk holding tank 22 contains a sweetener solution (sugar-water) 24 which is transferred to a concentrator 26 wherein by driving off water as vapor 30, a syrup 28, of approximately 82 Brix concentration is formed. Of course, if the sweetener solution is already at the desired solids concentration, the concentrating step is not necessary. If a frosted coating appearance is desired, a very small amount of HFCS is added to the sucrose-water solution in the holding tank. Where a powdered sugar look is desired, the HFCS is omitted.

Positive displacement pump 32 pressurizes the syrup 28 so the solution is at a pressure of 40 to 200 psig for introduction into a heater 112 wherein the pressurized syrup is superheated to a temperature of up to 450° F. and, preferably up to about 290° F. and most preferably to a temperature in the range of 260° to 290° F. The pressurized superheating maintains the water content of the heated syrup thus maintaining the pre-selected solids concentration or solute/solvent ratio while raising the solution energy content.

In apparatus 110, the heated and pressurized syrup 114 is sprayed onto the conveyed food product to form a hot coated cereal product 116 which leaves apparatus 110 at a temperature of about 200° F. The spray is generated by passing the syrup through spray heads which cause pressure loss thus contributing to the evaporation of moisture from the syrup. The removal of moisture by flash evaporation effectively increases the concentration of the solute in the droplets. The evaporative cooling effect and increased ratio of solute/solvent result in a syrup condition where, according to the phase diagram of the sucrose-water system, crystal formation commences.

It has been found that the spraying step has an influence on the resulting topical coating. Decreased droplet size and increased droplet fall time have a beneficial effect on crystallization. This is surprising since the conventional wisdom is that conditions are better for nucleation in larger volumes of solution.

In the process of the invention the elevation of the spray above the conveyed food product in the coating device can be varied according to the desired coating appearance. Longer drop times are obtained by increased elevation of the spray nozzle above the food product and result in smaller droplets of the solution.

The spray nozzles are at an elevation and of a design so as to provide a dispersion angle which enables the sprayed sweetener solution to coat particles over the cross section of the apparatus 110. However, the elevation of the spray with respect to the bulk of the food stuff must be sufficient to allow a proper drop period so as to evaporate the moisture of the concentrated pressurized sweetener solution. In a preferred embodiment the elevation of the spray nozzle or assembly is from about 10 to 20 inches above the bulk of the food mass.

It has also been found that the use of a compressed gas stream to atomize the sprayed solution when the solution has been sprayed provides an additional degree of control of crystallization and the coating appearance. Improved crystallization results from the use of higher pressure gas. If no compressed gas, low pressure compressed gas or an insufficient amount of compressed gas is utilized, the resulting coating tends to have a glazed appearance or an appearance similar to that of a glazed coating while higher pressure or higher gas flow rates tend to give a powdered sugar appearance. Preferably the sprayed or atomized droplets are not larger than about 0.1 inches and are most preferably of smaller dimension down to about 0.001 inches. However, the sprayed solution should not be atomized such that a significant amount of the droplets are entrained by air currents and are independently or separately conveyed out of the coating apparatus 110.

In one embodiment, depending on the desired appearance of the coating to be formed, the sprayed sweetener is subjected to external atomization. That is to say that the spray is atomized when discharged from the spray nozzle by the use of compressed gas, preferably clean, food grade quality air. The compressed air is at a pressure of 40 to 60 psig and is at a rate of approximately 0.2 to 0.4, and preferably about 0.3, standard cubic feet per pound of sweetener solution. The compressed air can be at room temperature but in a preferred embodiment is heated. In a most preferred embodiment, the compressed gas is air and is heated to a temperature in the range of about 150° to about 250° F.

The spray nozzle arrangement may be part of a spray gun assembly. Suitable spraying nozzles for external mixing and assemblies with control are available from Spray Systems Co. of Wheaton, Ill. The external application of compressed air can also be accomplished with a double nozzle system where the compressed air stream emanates from a separate but adjacent nozzle oriented so as to shatter the spray droplets as they pass out of the syrup spray nozzle.

Optionally, the apparatus 110 may be formed with a heating jacket. This construction allows the apparatus to be warmed to assist in removing any accumulation from the walls during scheduled or unscheduled outages. While the coating apparatus is preferably operated without the addition of heat beyond that contained in the food product, the syrup or compressed gas, heat to assist in drying the coating may be added through the heating jacket and/or by the introduction of heated air into the drum. However, such an embodiment compromises advantageous aspects of the invention and will not enable one to realize the full energy savings obtainable by practicing the invention in accordance with the preferred embodiment.

Evaporation of moisture in coating apparatus 110 produces a vapor stream 118. Because the product is coated almost immediately after leaving the oven and there is no intermediate pre-coating cooling step, the thermal energy contained in the hot product helps to dry the coating.

The vaporized moisture within apparatus 110 is removed under slight vacuum through at least one exhaust as described hereinafter. The coated product 116 is discharged from apparatus 110 and is fed into cooler 120 for cooling to a temperature below about 110° F. The cooled product is then ready for packaging or storage. In summer months, a dehumidification unit may be added to the cooler to control the moisture content of the product.

In the process of the invention, the processing period of the product from its removal from the oven is significantly reduced without sacrifice of product quality or organoleptic attributes. The average processing time from oven discharge to packaging or storage using the process of the invention ranges from about 80 to 120 seconds with about 90 seconds being the average. Further, the food product is subjected to reduced processing. Only 2 (excluding intermediate transport) process operations are performed on the product after toasting, i.e. coating and cooling.

Figure 3:
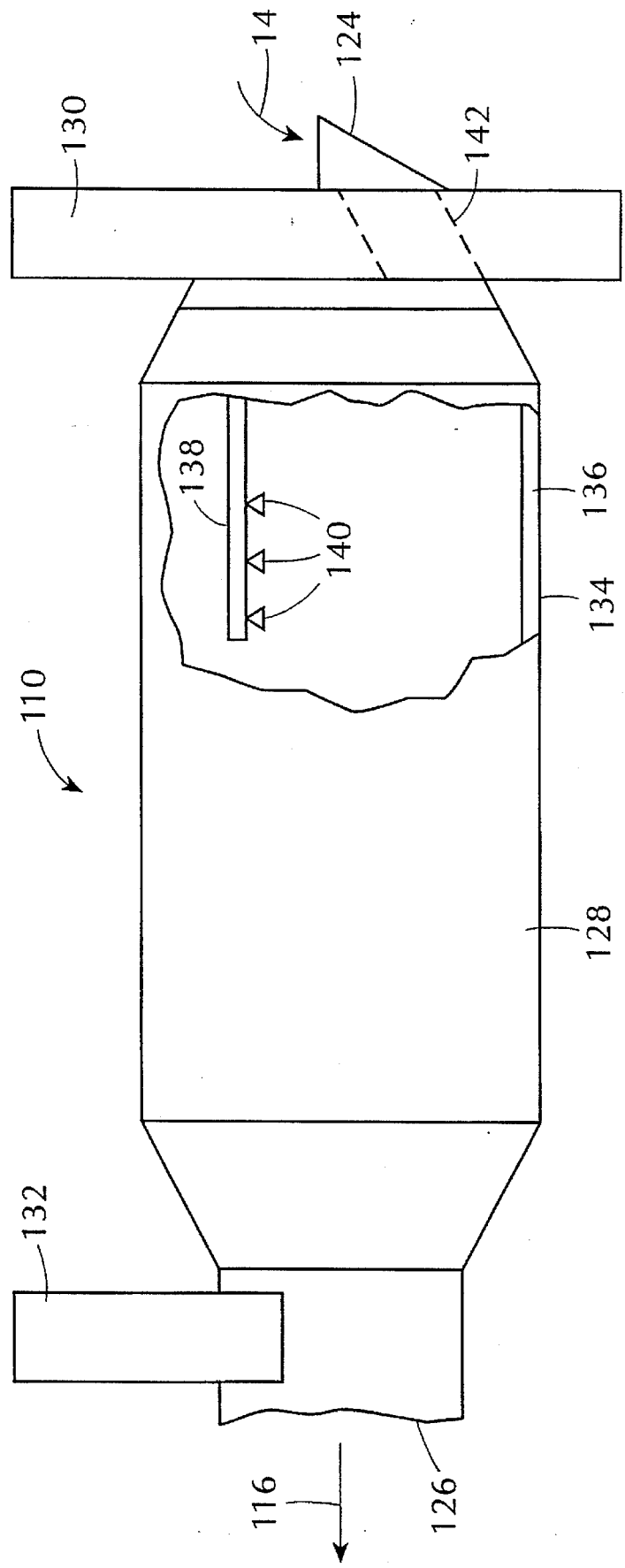
FIG. 3 generally is a front elevation view in partial cutaway of a preferred embodiment of the coating apparatus of the invention.

Referring to FIG. 3, the coating apparatus 110 has a feed inlet 124 and a product outlet 126 and is preferably in the configuration of an elongated cylindrical section 128 which is preferably arranged with a slight decline from the feed inlet to the product outlet. The drum 128 rotates about its longitudinal axis and, in a preferred embodiment, is exhausted near the feed end through exhaust duct 130 In another embodiment, the drum is exhausted near the feed end and the discharge end through exhaust ducts 130 and 132. The use of variable speed drive systems or other transmission devices enables one to adjust for capacity or processing time. The food product 14 generally moves, with a tumbling motion, from the feed inlet 124 along the length of the coating apparatus 110 to the product discharge 126. Air, preferably pre-filtered, flows through the cylinder 128 counter-current to the mass flow of the cereal.

The inner wall 134 of the coater 110 has thereon at least one, and preferably a plurality of, lifters 136 which assist in moving the product through the apparatus while simultaneously lifting and separating or fluffing the food product. The lifters may be formed integral with the drum or, more preferably, may be secured to the drum or drum material after formation. The lifters are preferably of a solid construction, are most preferably configured as bars having a triangular cross-section and extend for at least a portion of the drum length especially in that area of the drum where the spray header or spray nozzles are present. Apparatus 110 and lifters 136 are of food quality or food grade materials and are preferably of a sanitary construction. The coater has ports to allow access for cleaning.

The coating apparatus interior is generally at about atmospheric pressure but in any event will be at a pressure condition less than that of the pressurized superheated syrup. Preferably, the coater 110 is operated below atmospheric pressure at about −1 to −2 inches w.g.

In coating drum 110, a spray header 138 extends for at least a portion of the apparatus length and is elevated with respect to the bulk of the conveyed food product. The spray header extends substantially parallel to the longitudinal axis of apparatus 110 and is equipped with at least one, and preferably a plurality of, spray heads 140. When the spray header is equipped with more than one spray nozzle, adjacent nozzles are preferably positioned so as to be offset from one another, i.e., at an angle of about 120°, i.e., at 4 and 8 o'clock, but generally directed toward the lower section or lower hemisphere of coater 110. The hot pressurized syrup is fed into header 138 and forced through the spray nozzles 140 to generate a spray which, depending on the desired coating appearance, is optionally atomized by compressed air. The sprayed and/or atomized spray droplets fall and coat the foodstuff particles.

In the process of the invention, air flows through the coater countercurrent to the direction of travel of the food mass. The air flow is generated by one or more fans or other air moving devices. The countercurrent air flow rates and velocities are such that no substantial amount of the food product or sprayed or atomized fluid or material is conveyed by the air flow within the drum. It has been found that air flow rates of 2 to 4 lbs. per minute per pound of food at air velocities of up to about 10 ft/sec. are satisfactory. The air as introduced into coater 110 can be at about room temperature and is preferably at about 85° to about 110° F.

The hot food product 14 is preferably introduced into the feed inlet 124 of coater 110 by an extension 142 surrounding the feed into apparatus 110 and extension 142 extends or protrudes into the coater 110 for a distance beyond duct 132. The extension 142 initially directs the food mass 14 into a section of the coater where the air flow or currents are less likely to have a flow pattern or carrying capacity to entrain or convey particles into the exhaust duct 130 thus avoiding loss of food mass and possible variations from specifications.

As can be seen, apparatus 110 is free of internal moving parts which results in less down time, fewer locations for accumulation and reduced cleaning time.

Figure 4:
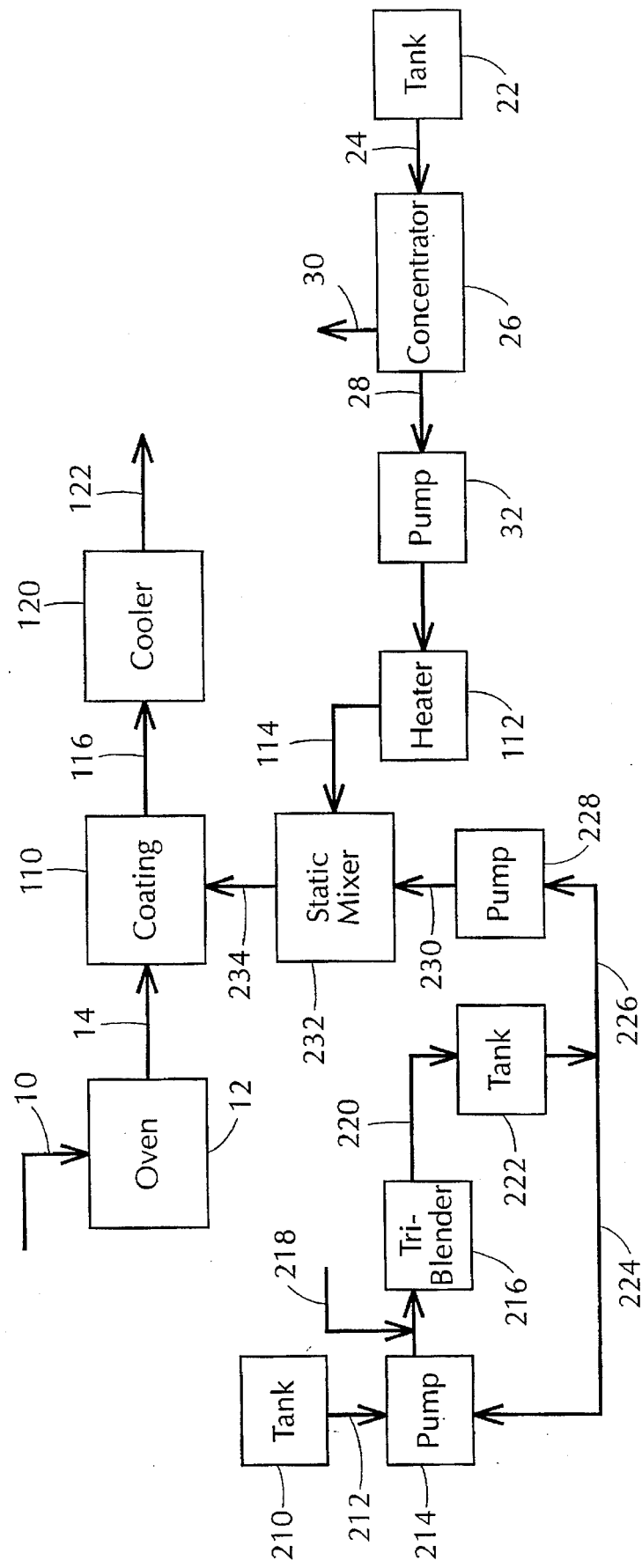
FIG. 4 schematically depicts in block diagram form a flow sheet for a preferred embodiment of the invention for applying a flavoring ingredient.

FIG. 4 is a modification of the system depicted in FIG. 2 and shows an embodiment of the invention wherein a flavoring is to be applied to the foodstuff in addition to the sweetener. The flavorings can be natural or artificial or a combination of both. Natural flavorings include, but are not limited to: natural vanilla and natural almond flavorings; cocoa; and spices, such as cinnamon, nutmeg and ginger. As artificial flavorings artificial strawberry, lemon, and pineapple-peach can be mentioned. Generally, the heat sensitive flavorings will undergo undesirable changes at a temperature within a range of from about 170° to 200° F. Of course, the actual temperature at which undesirable changes in the flavoring will occur varies from substance to substance and is readily ascertainable from flavoring suppliers and their product literature.

Referring to FIG. 4, a liquid feed tank 210 containing water and/or food grade oil such as a tropical or seed oil, preferably a partially hydrogenated vegetable oil, at a temperature of about 180° F. is shown. If the oil is supplied as a flaked product, it must be melted to a liquid phase. Typical melting points for such oils are in the range of about 100°–120° F. The heated liquid 212 is transported by a pump 214 to a tri-blender 216 wherein the heated liquid is intimately blended with a dry mix 218. Dry mix 218 may be added to the tri-blender or introduced into the heated liquid prior to the latter's introduction into blender 218. The dry mix contains one or more flavorings which may be, or include, a heat sensitive material which, for the present description of a preferred embodiment is cocoa. The relative weight ratio of dry mix to liquid is in the range of (0.5 to 4.5):1. A solution or slurry 220 is formed in the tri-blender and is transferred to the tank 222. The solution or slurry 220 is maintained at about 180° F. and is discharged from the tank at a rate such that a portion 224 of the fluid 220 is recycled to mix with the fresh liquid feed from tank 210. Another portion 226 of the solution or slurry 220 is pressurized by a pump 228 to about the same pressure as superheated stream 114. The pressurized flavoring fluid 230 is introduced into a mixer mixing chamber or mixing valve 232. Superheated and pressurized sweetener solution 114 is also introduced into mixer 232 where the sweetener and flavor phases are brought into contact and are quickly mixed. The sweetener-flavoring fluid or slurry 234 is then introduced into coating drum 110 wherein it is applied to the food product as previously described in connection with FIG. 2. The residence time of the flavor slurry in mixer 232 from its introduction into the mixer until its discharge from the spray nozzle(s) 140 in the coater 110 is from about 10 to 30 seconds and preferably no more than about 15 to 20 seconds. The period will vary depending on the nature of the flavoring component(s), the temperatures of the streams and the temperatures at which the material starts to degrade or caramellize.

The coated product is discharged from the drum at 126 and is further processed as is the discharged sweetened product discussed above with respect to the embodiment depicted in FIG. 2.

Thus it will be seen that the process of the invention permits the simultaneous application of a sweetening and flavoring coating while controlling the appearance of the coating and providing the ability to fashion topical coatings with unique characteristics.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. A process for producing a surface coating on a food stuff comprising:
   introducing a hot food product into a coating vessel having an inlet area and a discharge area;
   causing the food product to move from the inlet area to the discharge area;
   providing a coating solution of a desired concentration and moisture content;
   pressurizing the coating solution;
   superheating the pressurized coating solution while essentially maintaining the solution moisture content;
   spraying the superheated concentrated solution of the coating onto the surface of the food product for at least a portion of the time while the food product moves from the inlet area to the discharge area to form a coated food product;
   maintaining a flow of air in the coating vessel countercurrent to the movement of the food product; and
   exhausting the coating vessel near the inlet area.

2. The process of claim 1 wherein without intermediate cooling of the hot food product, the superheated solution of the coating is sprayed onto the food product.

3. The process of claim 1 further comprising discharging the coated food product from the coating vessel and cooling the coated food product.

4. The process of claim 1 wherein the spraying is through a spray means and the spray solution is atomized externally of the spray means.

5. The process of claim 4 wherein the sprayed solution is atomized by a compressed gas which optionally is heated.

6. The process of claim 5 wherein the compressed gas is air.

7. The process of claim 6 wherein the compressed air is at a pressure of 40 to 60 psig.

8. The process of claim 1 wherein the coating vessel is also exhausted near the discharge area.

9. The process of claim 1 wherein the coating is a sweetener.

10. The process of claim 9 wherein the sweetener comprises at least one of sucrose, glucose, dextrose, corn syrup, fructose, honey or an artificial sweetener.

11. The process of claim 1 wherein the food product is a cereal, snack food or pastry.

12. The process of claim 1 wherein the superheated solution is at a pressure of 40 to 200 psig.

13. The process of claim 4 wherein the atomized solution droplets are of a dimension of about 0.001 to about 0.1 inches.

14. The process of claim 1 wherein the food product is lifted and separated during the coating process.

15. The process of claim 9 wherein the sweetener is a sucrose-water solution and optionally contains HFCS.

16. The process of claim 5 wherein at least one of the compressed gas pressure, compressed gas volume, the solution concentration, or the degree of superheat is controlled.

17. The process of claim 1 wherein the sweetener solution is concentrated prior to its being superheated.

18. A method of controlling crystal formation on a product surface in a topical coating process comprising:
   introducing a hot product into a coating vessel having an inlet area and a discharge area;
   forming an aqueous solution of a sweetener;
   pressurizing the aqueous solution;
   superheating the pressurized aqueous solution;

spraying the superheated pressurized aqueous solution onto the product surface in a coating vessel whereby the sprayed solution is subjected to evaporative cooling during deposition of the sprayed solution onto the surface; and causing the product to move from the inlet area to the discharge area;

maintaining a flow of air in the coating vessel countercurrent to the movement of the product;

exhausting the coating vessel near the inlet area.

19. The method of claim 18 wherein the sprayed aqueous solution is atomized, optionally by a compressed gas, which optionally is heated.

20. The method of claim 19 wherein the compressed gas is air.

21. The method of claim 18 wherein the sweetener is at least one of sucrose, fructose, corn syrup, glucose, dextrose, honey or an artificial sweetener.

22. The method of claim 18 wherein the sweetener is sucrose and HFCS is optionally added to the aqueous solution.

23. The method of claim 18 wherein at least one of the compressed gas pressure, compressed gas volume, the solution concentration or the degree of superheat is controlled.

24. The method of claim 18 wherein the superheated pressurized aqueous solution is mixed with a flavoring phase to form a flavoring fluid or slurry and the flavoring fluid or slurry is sprayed onto the food product in the coating vessel.

25. A process for producing a surface coating on a food stuff comprising:

providing a hot food product;

providing a coating fluid of desired concentration and moisture content;

pressurizing the coating fluid;

superheating the pressurized coating fluid while essentially maintaining the fluid moisture content; and spraying the coating fluid onto the surface of the food product to form a coated food product, the coating fluid comprising a superheated concentrated sweetener solution and a flavoring.

26. The process of claim 25 wherein the coating fluid is sprayed onto the food product without intermediate cooling of the hot food product.

27. The process of claim 25 further comprising cooling the coated food product.

28. The process of claim 25 wherein the spraying is through a spray means and the spray coating fluid is atomized externally of the spray means.

29. The process of claim 25 wherein the sprayed fluid is atomized by a compressed gas, such as air, which optionally is heated and at a pressure of 40 to 60 psig.

30. The process of claim 25 wherein the sweetener comprises at least one of sucrose, glucose, dextrose, corn syrup, fructose, honey or an artificial sweetener.

31. The process of claim 25 wherein the superheated solution is at a pressure of 40 to 200 psig.

32. The process of claim 25 wherein the food product is lifted and separated during the coating process.

33. The process of claim 25 wherein the sweetener is a sucrose-water solution and optionally contains HFCS.

34. The process of claim 29 wherein at least one of the compressed gas pressure, compressed gas volume, the solution concentration, or the degree of superheat is controlled.

35. The process of claim 25 wherein the sweetener solution is concentrated prior to its being superheated.

36. The process of claim 25 wherein the flavoring contains a heat sensitive material.

37. The process of claim 36 wherein the heat sensitive material is cocoa.

38. The process of claim 36 wherein the heat sensitive material is a natural flavoring, an artificial flavoring or a mixture thereof.

39. The process of claim 25 wherein the flavoring and the concentrated sweetener solution are blended in a mixer and then sprayed onto the food product within a period of from about 10 to 30 seconds, and preferably a period of about 15 to 20 seconds.

40. The process of claim 36 wherein the hot food product is introduced into a vessel having a feed end and a product discharge end in which the coating fluid is sprayed onto the food, product and an air flow is established in the coating vessel countercurrent to the flow of the food product.

41. The process of claim 40 wherein the coating vessel is exhausted in the area of the feed end and in the area of the product discharge end.

42. A food product having a surface coating formed thereon by the process of claim 25.

* * * * *